April 15, 1924.
F. AESCHBACH
MACHINE FOR MAKING CONFECTIONERY
Filed Jan. 12, 1924
1,490,550
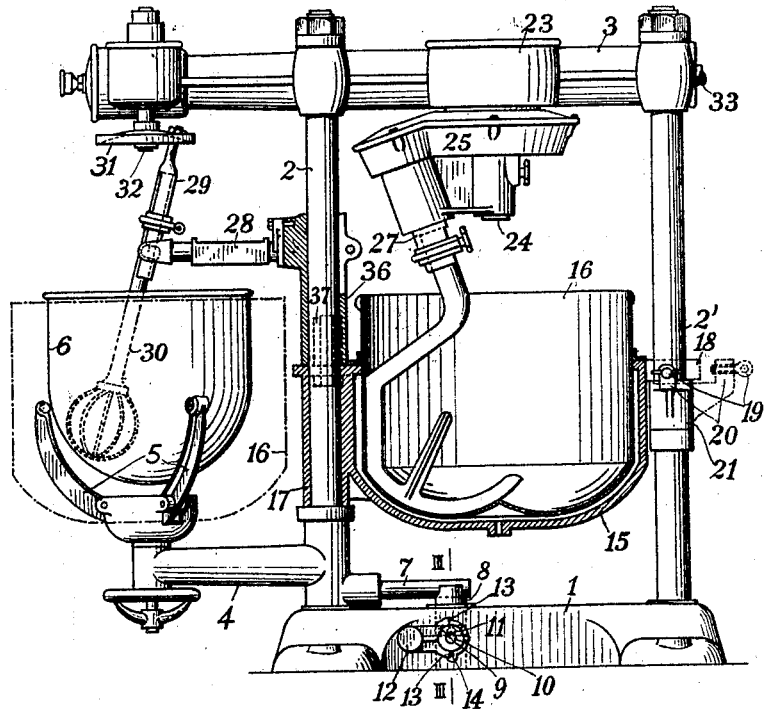
Fig. 1
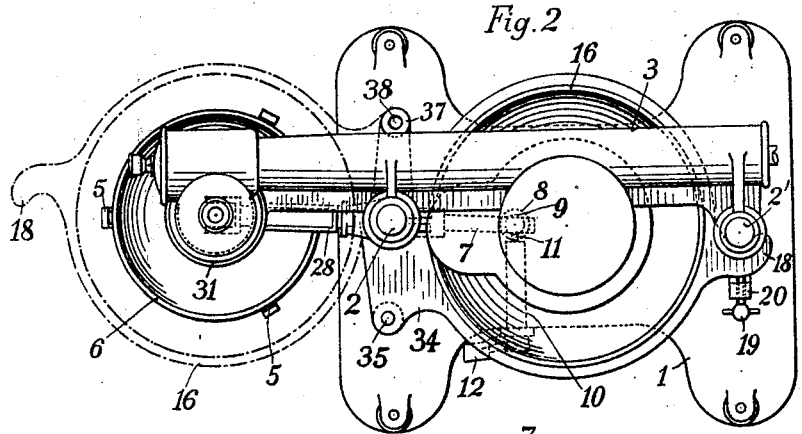
Fig. 2
Fig. 3
Friedrich Aeschbach,
INVENTOR:
By Otto Munk
his Attorney.

Patented Apr. 15, 1924.

1,490,550

UNITED STATES PATENT OFFICE.

FRIEDRICH AESCHBACH, OF AARAU, SWITZERLAND.

MACHINE FOR MAKING CONFECTIONERY.

Application filed January 12, 1924. Serial No. 685,778.

*To all whom it may concern:*

Be it known that I, FRIEDRICH AESCHBACH, a citizen of the Swiss Confederation, and residing at Aarau, Switzerland, have invented certain new and useful Improvements in Machines for Making Confectionery, of which the following is a specification.

This invention relates to a confectionery machine having a rotating and spinning kneading and mixing arm and a beater. In known machines of this kind it is necessary, when making a doughy mass that requires white of egg beaten stiff, to beat the latter in the dough by means of the kneading and mixing arm or to put into the dough trough white of egg beaten outside with the beater. In the former case it takes a relatively long time for the white of egg to be beaten because the kneading and mixing arm has only a low speed relatively to the beater, and in the latter case a relatively large amount of white of egg is lost and the white of egg is itself prejudicially affected by the emptying.

In the confectionery or sweet-meat machine forming the subject-matter of this invention this defect is obviated by arranging that the dough trough and the beater trough can be slewed around a column common to them both and have an equal axial overhang, for the purpose of being able to work in the dough trough with the beater.

One embodiment of the invention is illustrated by way of example in the accompanying drawing, wherein:

Figure 1 shows the improved machine in side elevation,

Figure 2 is a plan, and

Figure 3 is a vertical section taken on the line III—III in Figure 1.

Referring to the drawing, the base plate 1 carries two columns 2, 2' which form with 1 a frame, and the columns have their upper ends connected together by a cross-bar 3. A jib-like arm 4 supported on the base 1 can be slewed round the column 2 and this jib carries a beater trough or pan 6 in known manner by means of three arms 5 pivoted to swing up and down. The jib 4 can be fixed in its working position by an arm 7 provided on the opposite side of the column 2, and a bolt 8 which is slidable vertically in the base 1 and has a forked upper end for embracing the arm 7. The bolt 8 has a peripheral groove 9 into which extends a pin 11 that is arranged eccentrically at the inner end of a horizontal shaft 10 journaled in the base plate 1, so that by turning the shaft 10 by means of a lever 12 carried by it the bolt 8 can be moved up and down and thereby be engaged with and disengaged from the arm 7. The lever 12 has two lugs 13 which are nearly diametrically opposite one another and together with a stop pin 14 their path limit the half revolution of the lever 10 out of one horizontal position into another, wherein the pin 11 and bolt 8 are in their highest or lowest position.

A pan-shaped steam-jacket 15 of a dough trough or pan 16 has a vertical long bearing 17 which rests on the bearing of the jib 4, so that the pan 16 and its jacket 15 can be slewed around the column 2. The jacket 15 is provided at its upper edge diametrically opposite to the bearing 17 with a laterally open hook 18 which can embrace the column 2' from one side and is pressed against it by a screw 19 carried by the column, so that the steam-jacket is firmly held between the two columns 2, 2'. The screw 19 is mounted in an L-shaped arm 20 of a sleeve 21 which is rotatable about the column 2' and bears on an adjustable ring 22 which can be so placed that the hook 18 rests on the sleeve 21. The steam-jacket 15 is thus supported at two diametrically opposite points when it is situated between the two columns.

Arranged on the cross-bar 3 between the two columns is a housing 23 from which depends a vertical shaft 24 which is driven in the housing by worm gearing (not shown) and carries at its lower end a casing 25. This casing contains an epicyclic gear comprising conical planet wheels (not shown) by which an inclined shaft 27 detachably carrying a kneading and mixing arm 26 can be rotated and at the same time be revolved bodily about the shaft 24.

On the column 2 is arranged a laterally extending arm 28 on which a hollow shaft 29 is so pivotally mounted that it can be swung towards all sides. A beater or whisk 30 is so mounted on the shaft 29 as to be detachable laterally and adjustable longitudinally. The upper end of the shaft 29 is pivotally connected with a horizontal rotating disc 31 eccentrically to its shaft 32. This shaft 32 is driven at a considerably higher speed than the shaft 24 by a gearing (not shown) driven, like that in the housing 23, by a shaft 33 within the hollow cross-bar 3. The shafts 24 and 32 are equally distant from the column 2 and they are coaxial with axes of rotation of the pans 16 and 6, respectively.

The described machine operates as follows:

If white of egg or the like is to be beaten to froth in the pan 16, after removing the beater 30 and lowering the bolt 8 the jib 4 is slewed round, and after detaching the kneading arm 26, loosening the screw 19 and turning the sleeve 20, 21 carrying the latter out of its position shown in full lines into the position shown in broken lines in Figure 1, the steam-jacket 15 with the pan 16 is swung round through 180°. For fastening the pan 16 in its new position the jacket 15 is provided at its upper edge with a lug 34 having a hole 35 connected to the side of the bearing 17, and with a tube 36 that is clamped to the column 2 and carries the arm 28; this tube has an arm 37 situated at right-angles to the arm 28, which arm 37 has a hole 38 that registers with the hole 35 so that a pin can be placed through the two holes 38 and 35, which pin, will prevent undesired turning of the steam-jacket 15 or pan 6 about the column 2. The beater 30 is subsequently, so replaced in the shaft 29 that it extends to almost the bottom of the dough pan which has a broad annular channel. White of egg can then be beaten stiff in the same in just as short a time as in the beater pan 6. After removing the beater from the shaft 29 the dough pan 16 can be again placed in its normal position between the two columns 2 and 2'. Similarly the beater pan 6 can be swung back into its operative position and then secured therein by the bolt 8.

I claim:

1. In a confectionery machine, the combination of a column, two pans mounted to swing about the same with their vertical axes equidistant from the center of the column, a rotating kneading arm mounted at one side of the column and arranged to operate in one of the pans, and a beater mounted at the opposite side of the column for operating in either of said pans at will.

2. In a confectionery machine, the combination of a column, two pans, whereof one is steam-jacketed, mounted to swing about the column with their vertical axes equidistant from the center of the column, a rotating mixing arm mounted at one side of the column and arranged to operate in one of the pans, and a beater mounted at the opposite side of the column for operating in either of said pans at will.

3. In a confectionery machine, the combination of a column, a beater pan and a steam-jacketed dough pan mounted thereon to swing about the same with their vertical longitudinal axes equidistant from the center of the column, a second column spaced away from one side of the first column so far that the jacketed dough pan can be situated between the two columns, a hook on the jacket of the dough pan arranged to detachably engage the second column, a rotary mixing arm mounted between said columns and arranged to operate in the dough pan, and a beater mounted at the opposite side of the first column for operating in either of said pans at will.

4. In a confectionery machine, the combination of a vertical supporting column, a jib arm mounted to rotate horizontally about the same, a beater pan carried by the free end of the arm, a steam-jacketed pan mounted to swing about the column with its vertical longitudinal axis at the same distance from the vertical axis of the column as the vertical longitudinal axis of the beater pan is distant therefrom, a rotating kneading arm mounted at one side of the column and arranged to operate in the said jacketed pan a rotary whisk mounted at the opposite side of the column for operating in either of said pans at will, and means for locking the jib arm in its operative position in relation to the said whisk.

In testimony whereof, I affix my signature in the presence of two witnesses.

FRIEDRICH AESCHBACH.

Witnesses:
R. HEINGARTNER,
A. BAILLEUX.